(12) United States Patent
Harugaichi et al.

(10) Patent No.: US 12,049,130 B2
(45) Date of Patent: Jul. 30, 2024

(54) LOWER STRUCTURE OF VEHICLE

(71) Applicant: Mazda Motor Corporation, Hiroshima (JP)

(72) Inventors: Shintaro Harugaichi, Hiroshima (JP); Sho Yoshida, Hiroshima (JP); Yosuke Sawada, Hiroshima (JP); Yasushi Ishikawa, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 35 days.

(21) Appl. No.: 17/517,807

(22) Filed: Nov. 3, 2021

(65) Prior Publication Data

US 2022/0169103 A1 Jun. 2, 2022

(30) Foreign Application Priority Data

Nov. 27, 2020 (JP) ................................ 2020-197220

(51) Int. Cl.
  *B60K 1/04* (2019.01)
  *B60R 16/04* (2006.01)

(52) U.S. Cl.
  CPC ................ *B60K 1/04* (2013.01); *B60R 16/04* (2013.01); *B60K 2001/0411* (2013.01); *B60K 2001/0438* (2013.01); *B60Y 2306/01* (2013.01)

(58) Field of Classification Search
  CPC ............. B60K 1/04; B60K 2001/0411; B60K 2001/0438; B60R 16/04; B60Y 2306/01
  See application file for complete search history.

(56) References Cited

U.S. PATENT DOCUMENTS

| 9,925,890 | B2 * | 3/2018 | Enning | B60L 50/64 |
| 11,214,310 | B2 * | 1/2022 | Hong | |
| 11,420,507 | B2 * | 8/2022 | Kuwahara | |
| 2009/0223725 | A1 * | 9/2009 | Rodriguez | B60L 7/14 |
| | | | | 180/65.21 |
| 2012/0160585 | A1 * | 6/2012 | Mildner | H01M 50/202 |
| | | | | 180/68.5 |
| 2013/0075173 | A1 | 3/2013 | Kato et al. | |
| 2022/0063391 | A1 * | 3/2022 | Kim | B62D 21/157 |

FOREIGN PATENT DOCUMENTS

| EP | 3800079 A1 | 4/2021 |
| JP | 2006-103535 A | 4/2006 |
| JP | 2013-67334 A | 4/2013 |

* cited by examiner

*Primary Examiner* — James A Shriver, II
*Assistant Examiner* — Nicholas R. Kandas
(74) *Attorney, Agent, or Firm* — XSENSUS LLP

(57) ABSTRACT

A lower structure of a vehicle may include a transmission disposed in a floor tunnel, a rear propeller shaft that transmits power from the transmission to rear wheels, and left and right battery units disposed on the left and right sides of the floor tunnel, in which a rear portion (transfer 4a) of the transmission is disposed in proximity to the portions on the front side and the upper side of the battery units, and inner protectors that cover inner side surface portions in the vehicle width direction of the battery units from the inner side in the vehicle width direction may be mounted to the front end portions of the inner side surface portions.

21 Claims, 11 Drawing Sheets

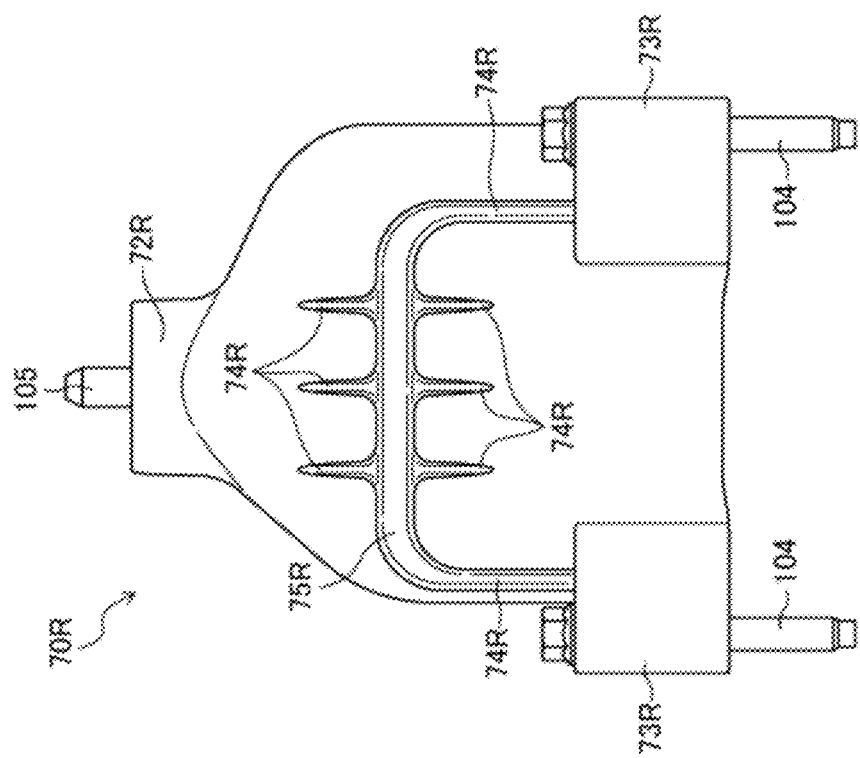

LOWER STRUCTURE OF VEHICLE

CROSS REFERENCE TO RELATED APPLICATION

The present application claims priority to Japanese patent application JP 2020-197220, filed Nov. 27, 2020, the entire contents of which being incorporated herein by reference in its entirety.

TECHNICAL FIELD

The technique disclosed herein relates to a technical field concerning a lower structure of a vehicle.

BACKGROUND ART

In recent years, many hybrid vehicles and electric vehicles have been produced and many vehicles have a large-capacity battery for operating a motor as the drive source.

For example, the hybrid vehicle described in patent document 1 has the structure in which a battery and an inverter for driving a motor are disposed so as to face each other in the vehicle width direction with a floor tunnel sandwiched therebetween and a harness for connecting the battery to the inverter is disposed so as to straddle the floor tunnel.

The hybrid vehicle described in patent document 2 is a vehicle in which the rear wheels serve as drive wheels and has the structure in which two battery packs are disposed so as to face each other in the vehicle width direction with the floor tunnel sandwiched therebetween and the rear portion of the gearbox and the propeller shaft are disposed in the floor tunnel.

PRIOR ART DOCUMENTS

Patent Documents

[Patent document 1] JP-A-2006-103535
[Patent document 2] JP-A-2013-67334

SUMMARY

Problems to be Solved

By the way, at the time of a front collision of the vehicle, the stroke in which the engine and the gearbox move backward is preferably increased as much as possible to absorb the collision load. For this purpose, it is considered that the stroke in which the engine and the gearbox move backward is increased as much as possible by disposing the gearbox with the rear portion thereof present in the floor tunnel so that the gearbox enters the floor tunnel at the time of a front collision of the vehicle.

Here, when the battery units are disposed on the left and right sides of the floor tunnel as in patent documents 1 and 2, if the gearbox is disposed with the rear portion thereof present in the floor tunnel, the battery units come closer to the gearbox. For this reason, when the gearbox moves diagonally backward with respect to the vehicle width direction with respect to the vehicle front-rear direction at the time of a front collision of the vehicle, the inner portions in the vehicle width direction of the battery units may come into contact with the gearbox, possibly damaging the battery units.

The technique disclosed herein addresses the problem described above and/or other problems with an object of suppressing damage to the battery units at the time of a front collision of the vehicle even when the gear box is disposed with a part thereof present in the floor tunnel.

Means for Solving the Problems

To solve the problem described above or other problems, according to some embodiments of the present disclosure disclosed herein, there is provided a lower structure of a vehicle in which a rear wheel serves as a drive wheel, the lower structure including a gearbox disposed with at least a portion thereof present in a floor tunnel formed by a tunnel panel, the portion being present on a vehicle rear side; a propeller shaft that extends from the gearbox toward the vehicle rear side, the propeller shaft transmitting power from the gearbox to the rear wheel; and left and right battery units disposed on a vehicle lower side of left and right floor panels, the left and right floor panels being disposed on a vehicle left side and a vehicle right side of the floor tunnel, in which the portion of the gearbox on the vehicle rear side is disposed in proximity to portions on a vehicle front side and a vehicle upper side of the left and right battery units, each of the left and right battery units has an inner side surface portion that extends in a vehicle front-rear direction along each of both side end portions in a vehicle width direction of the floor tunnel, and each of the left and right battery units has an inner protector that covers a front end portion of each of the inner side surface portion from an inner side in the vehicle width direction.

According to this structure, since the portion of the gearbox on the vehicle rear side is present in the floor tunnel, the gearbox enters the floor tunnel at the time of a front collision of the vehicle. The inner side surface portions of the battery units are located at the position of the floor tunnel. In addition, the portion of the gearbox on the vehicle rear side is disposed in proximity to the portions on the vehicle front side and the vehicle upper side of the battery units. Accordingly, the gearbox may come into contact with the inner side surface portions of the battery units at the time of a front collision of the vehicle.

As a measure against this, in the above structure, the inner protector that covers the front end portion of the inner side surface portion is mounted to each of the battery units. This prevents the gearbox from coming into direct contact with the inner side surface portions of the battery units even when the gearbox moves backward so as to approach one of the left and right battery units at the time of a front collision of the vehicle. As a result, damage to the battery units is suppressed.

In the lower structure of a vehicle, each of the inner protectors may have a protection portion that actually covers each of the inner side surface portions, and a vehicle body connection portion to be connected to a vehicle body structural member of the vehicle, and the vehicle body connection portion of the inner protector may have a smaller width in a vehicle front-rear direction than the protection portion.

According to this structure, since the inner protectors are connected to the vehicle body member, the inner protectors also serve as the brackets that mounts the battery units to the vehicle body and supports the battery units. In addition, since the inner protectors are connected to the vehicle body structural member, the vehicle body can receive the collision load input when the gearbox comes into contact with the inner protector. Furthermore, since the vehicle body connection portion of the inner protector has a smaller width in the vehicle front-rear direction than the protection portion, the weight can be reduced. Accordingly, the weight of the vehicle can be reduced while damage to the battery units is suppressed.

In the lower structure of a vehicle according to an embodiment, a reinforcing rib is formed on an outer side surface portion in the vehicle width direction of the inner protector.

This structure suppresses damage to the inner protector even when the gearbox comes into contact with the inner protector at the time of a front collision of the vehicle and the collision load is input to the inner protector. As a result, damage to the battery units can be suppressed more effectively.

In the embodiment described above, the reinforcing rib may include a plurality of vertical ribs that extend in an up-down direction.

That is, since the portion of the gearbox on the vehicle rear side is disposed in proximity to the portions on the vehicle front side and the vehicle upper side of the battery units, the gearbox moves backward and moves from the upper side to the lower side at the time of a front collision of the vehicle. Accordingly, the collision load is probably input to the inner protector in the up-down direction. Accordingly, damage to the inner protectors can be effectively suppressed because the reinforcing rib includes the plurality of vertical ribs.

In the embodiment described above, the reinforcing rib includes a horizontal rib that extends in the vehicle front-rear direction, and at least a part of the horizontal ribs is located at the same height as the tunnel panel.

According to this structure, when the collision load in the vehicle width direction is input to the inner protectors, the horizontal ribs come into contact with the tunnel panel, whereby the collision load can be received by the vehicle body. This can prevent the collision load from being transmitted to the battery units and damage to the battery units can be suppressed more effectively.

In the lower structure of a vehicle described above, the inner side surface portion of each of the left and right battery units may have a projecting portion that projects to the inner side in the vehicle width direction, the inner protector may be disposed in a region above the projecting portion of the inner side surface portion, the inner protector being fixed to the projecting portion via a shaft-like fastening member, and the shaft-like fastening member may be fastened so as to extend in the up-down direction.

According to this structure, even when the gearbox comes into contact with the inner protectors and the collision load is input to the inner protectors, the shaft-like fastening portion can appropriately receive the load. This can appropriately prevent the inner protectors from peeling off from the battery units.

In the lower structure of a vehicle described above in which the inner side surface portion of each of the left and right battery units has the projecting portion, an inner surface in the vehicle width direction of the inner protector may be located at substantially the same position in the vehicle width direction as an inner end portion, $41aL0$ or $42aL0$, of the projecting portion $41aL$ or $42aL$ in the vehicle width direction.

According to this structure, it is possible to prevent the battery units from dropping at the time of a front collision of the vehicle because the gearbox is caught by the projecting portion. As a result, damage to the battery units can be suppressed more effectively.

In the lower structure of a vehicle described above, each of the left and right battery units may have a front protector that covers a front end portion of the inner protector from the vehicle front side.

According to this structure, it is possible to prevent the inner protectors from peeling off from the battery units because the gearbox is caught by the front end portions of the inner protectors at the time of a front collision of the vehicle. As a result, damage to the battery units can be suppressed more effectively.

In the lower structure of a vehicle described above, the portion of the gearbox on the vehicle rear side may be included in a transfer.

According to this structure, damage to the battery unit can be appropriately suppressed even in, for example, a four-wheel-drive structure.

Advantage of the Disclosure

As described above, according to the technique disclosed herein, even when the gearbox is disposed with a part thereof present in the floor tunnel, damage to the battery units at the time of a front collision of the vehicle can be suppressed.

BRIEF DESCRIPTION OF THE DRAWINGS

FIG. 11 is a perspective view illustrating an outer surface in the vehicle width direction of a right inner protector according to an exemplary embodiment.

MODES FOR CARRYING OUT THE DISCLOSURE

Exemplary embodiments will be described in detail below with reference to the drawings. In the following description, the front, rear, upper, and lower sides of a vehicle 1 are simply referred to as the front, rear, upper, and lower sides, respectively. In addition, the left and the right when the front side is seen from the rear side are simply referred to as the left and the right, respectively.

Figure 1:
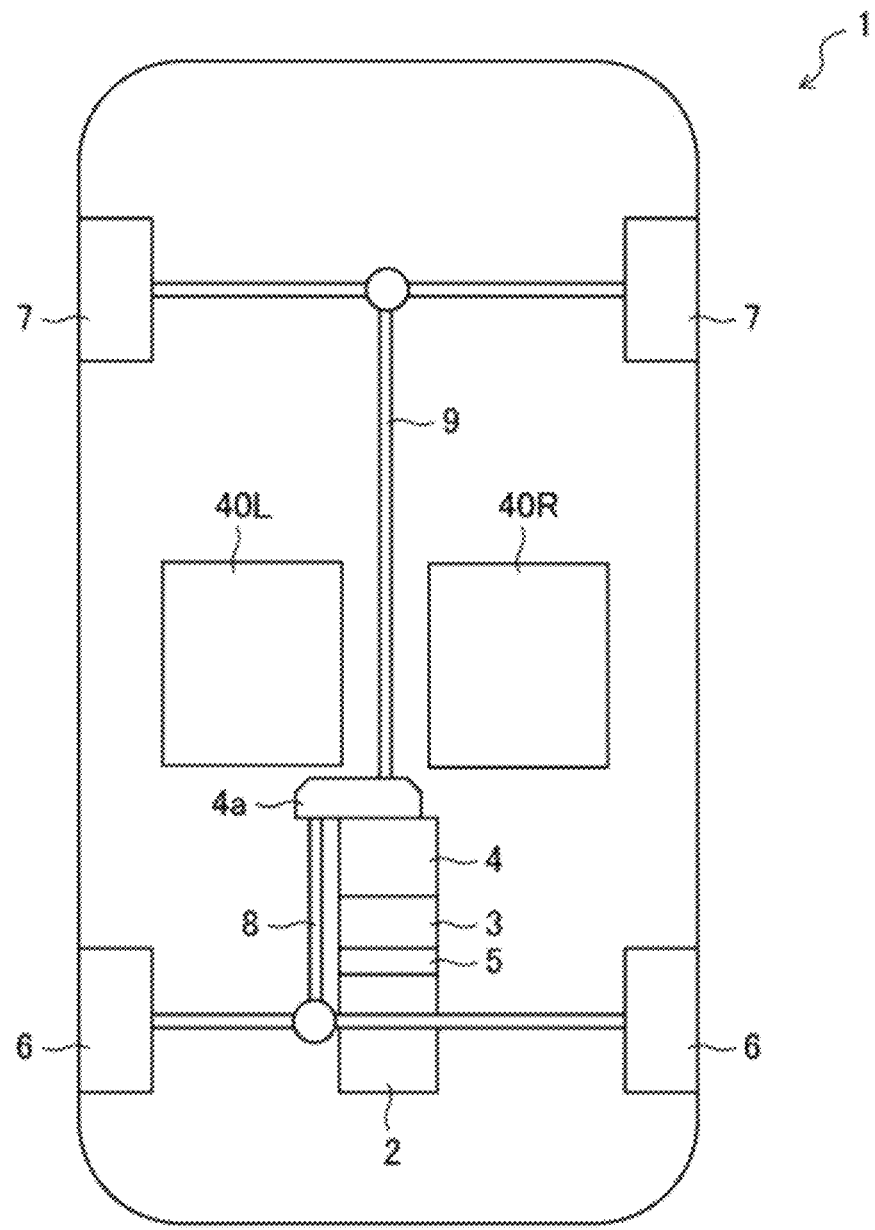
FIG. 1 is a schematic view illustrating a drive system of a vehicle having a lower structure according to an exemplary embodiment.
Figure 2:
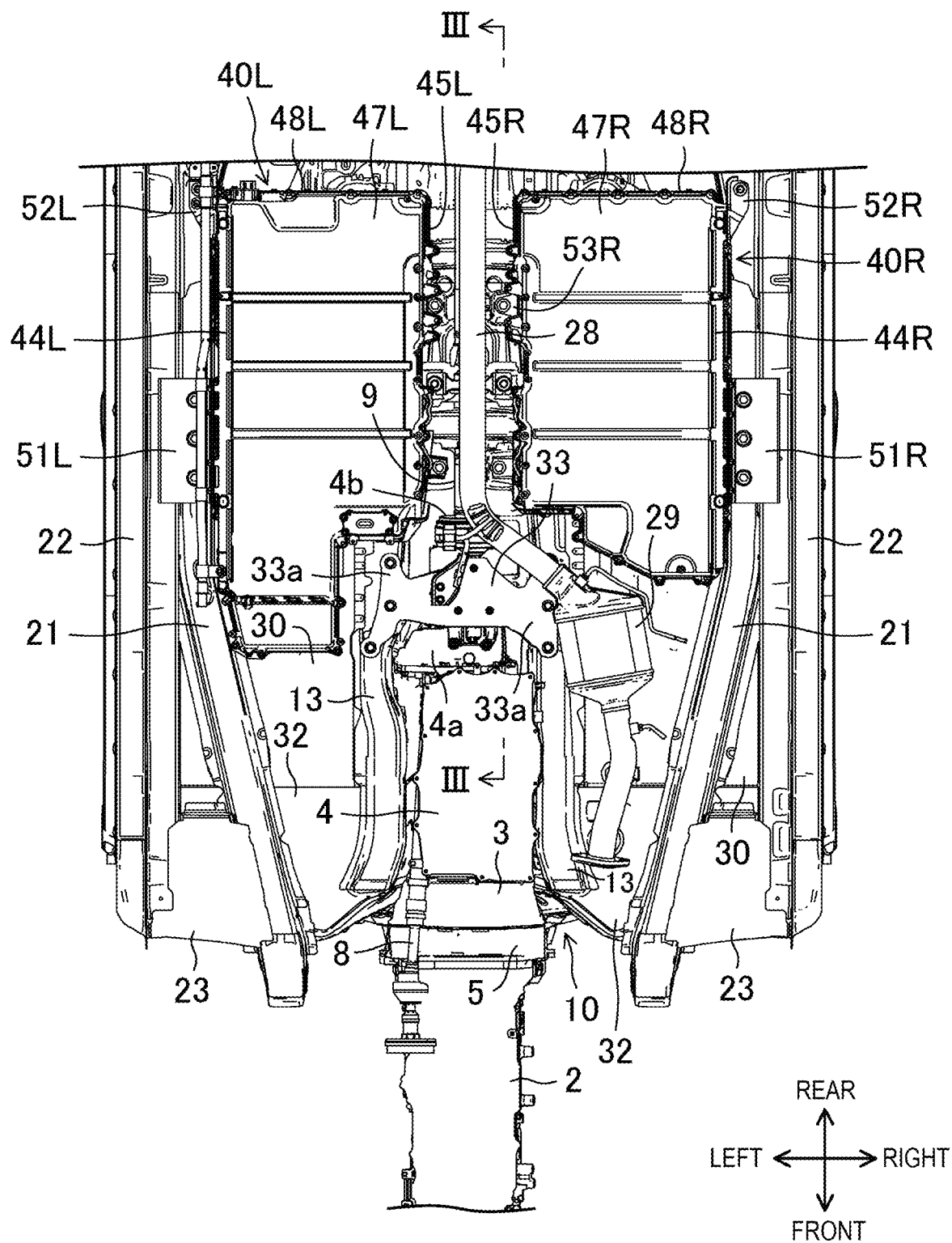
FIG. 2 is a bottom view illustrating the periphery of a driver seat and a passenger seat of the vehicle as seen from below according to an exemplary embodiment.

FIG. 1 schematically illustrates a drive system of the vehicle 1 to which a lower structure according to one embodiment has been applied. FIG. 2 illustrates in detail the bottom surface of the periphery of a driver seat and a passenger seat of the vehicle 1 according to one embodiment of the present disclosure. FIG. 1 illustrates the disposition in the vehicle 1 as seen from below.

In one embodiment, the vehicle 1 is a hybrid vehicle and includes an engine 2 and a motor 3 as drive sources and a transmission 4 that changes the speed of a driving force transmitted from at least one of the engine 2 and the motor and transmits the driving force. The engine 2 is vertically mounted substantially in the middle in the vehicle width direction in an engine room formed in the front of a vehicle interior. The motor 3 is disposed behind the engine 2 with a damper 5 sandwiched therebetween. The transmission 4 is vertically mounted behind the motor 3.

The vehicle 1 may be a vehicle having left and right rear wheels 7 as the driving wheels. Optionally, the vehicle 1 has a four-wheel-drive structure in which both the left and right front wheels 6 and the left and right rear wheels 7 are driving wheels. The rear portion of the transmission 4 is a transfer 4a that transmits the driving force to the front wheels 6 and the rear wheels 7. A front propeller shaft 8 extends toward the front side from the transfer 4a. A rear propeller shaft 9 extends toward the rear side from the transfer 4a. The front propeller shaft 8 is disposed slightly to the right of the middle in the vehicle width direction and the rear propeller shaft 9 is disposed substantially in the middle in the vehicle width direction. Although not described in detail, the driving force changed in speed by the transmission 4 is transmitted to the front propeller shaft 8 and the rear propeller shaft 9 via the transfer 4a. Then, the driving force is transmitted to the front wheels 6 and the rear wheels 7 via the front propeller shaft 8 and the rear propeller shaft 9, respectively.

As illustrated in FIG. 2, in one embodiment, the transmission 4 is disposed in the floor tunnel 10 so as to be inclined to the lower side from the front side toward the rear side. The transfer 4a of the transmission 4 is disposed in proximity to the portions on the front side and the upper side of the battery units 40L and 40R, which will be described later.

Figure 3:
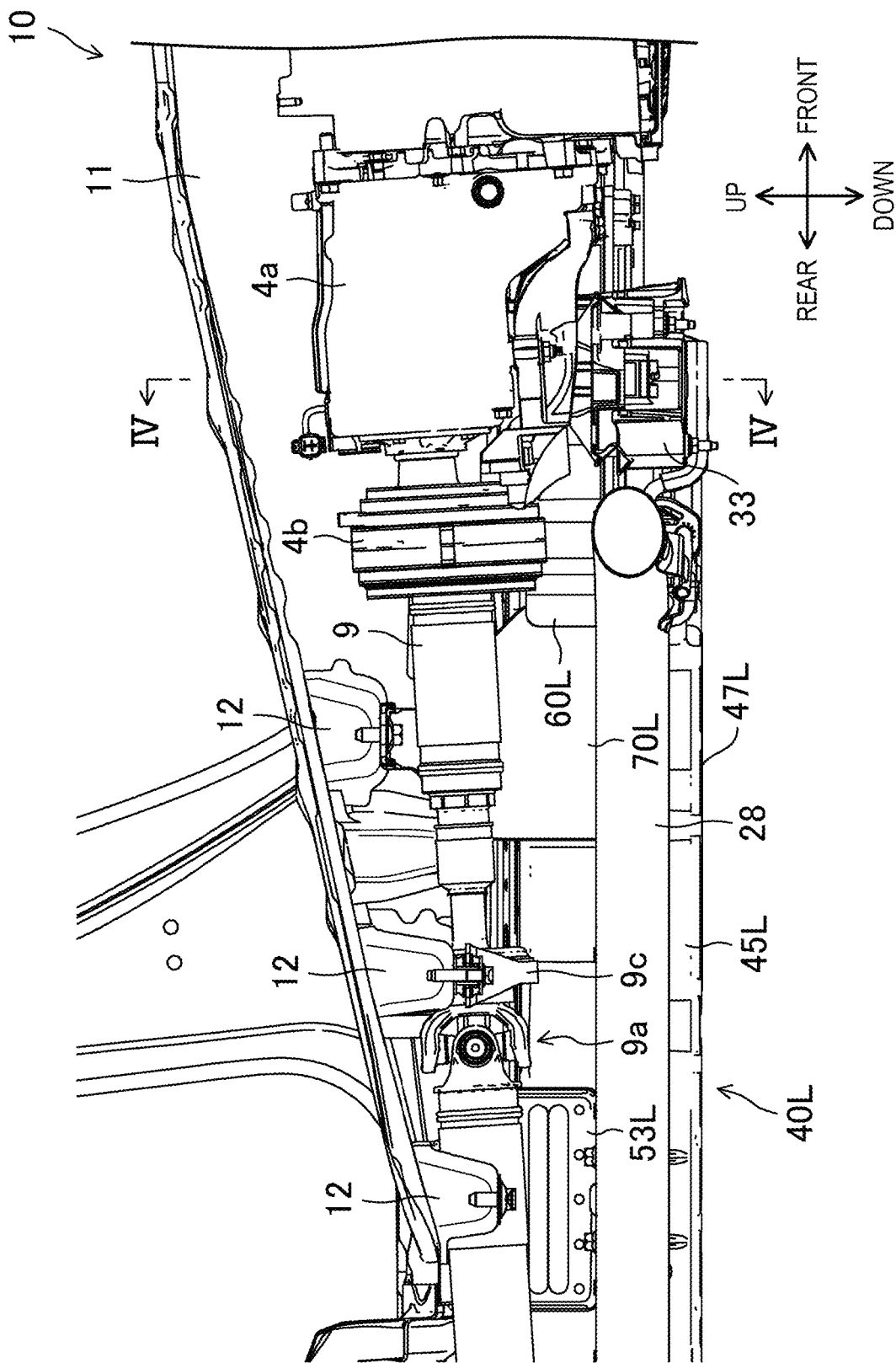
FIG. 3 is a diagram illustrating the inside of a floor tunnel as seen from the vehicle right side according to an exemplary embodiment.

In one embodiment, the floor tunnel 10 is formed by a tunnel panel 11. As illustrated in FIG. 3, the upper end portion of the tunnel panel 11 is inclined to the lower side from the front side toward the rear side. Accordingly, the floor tunnel 10 is narrower in the up-down direction toward the rear side.

The rear propeller shaft 9 is disposed in the floor tunnel 10. The rear propeller shaft 9 is connected to the transfer 4a via a rubber cup 4b. The rear propeller shaft 9 extends from the position of the rubber cup 3b toward the rear side while being inclined to the lower side. A universal joint 9a is provided at the middle position in the front-rear direction of the rear propeller shaft 9. The rear propeller shaft 9 pivots in the up-down direction and the left-right direction due to the universal joint 9a at the time of a front collision.

A rubber cup 9b is provided in front of the universal joint 9a in the rear propeller shaft 9. A support bracket 9c that supports the rear propeller shaft 9 is provided at the position of the rubber cup 9b. The support bracket 9c has a U-shape that covers the rubber cup 9b from below and the left and right end portions thereof are connected, with bolts, to an upper tunnel reinforcement 12 for reinforcement, which is provided on the tunnel panel 11.

Side tunnel reinforcements 13 that extend in the front-rear direction are provided in the left and right end portions of the tunnel panel 11, respectively. The side tunnel reinforcements 13 are members for reinforcing the tunnel panel 11. The side tunnel reinforcements 13 are connected to the inner portion of the tunnel panel 11 by welding so as to form closed cross sections between the side tunnel reinforcements 13 and the tunnel panel 11.

Figure 9:
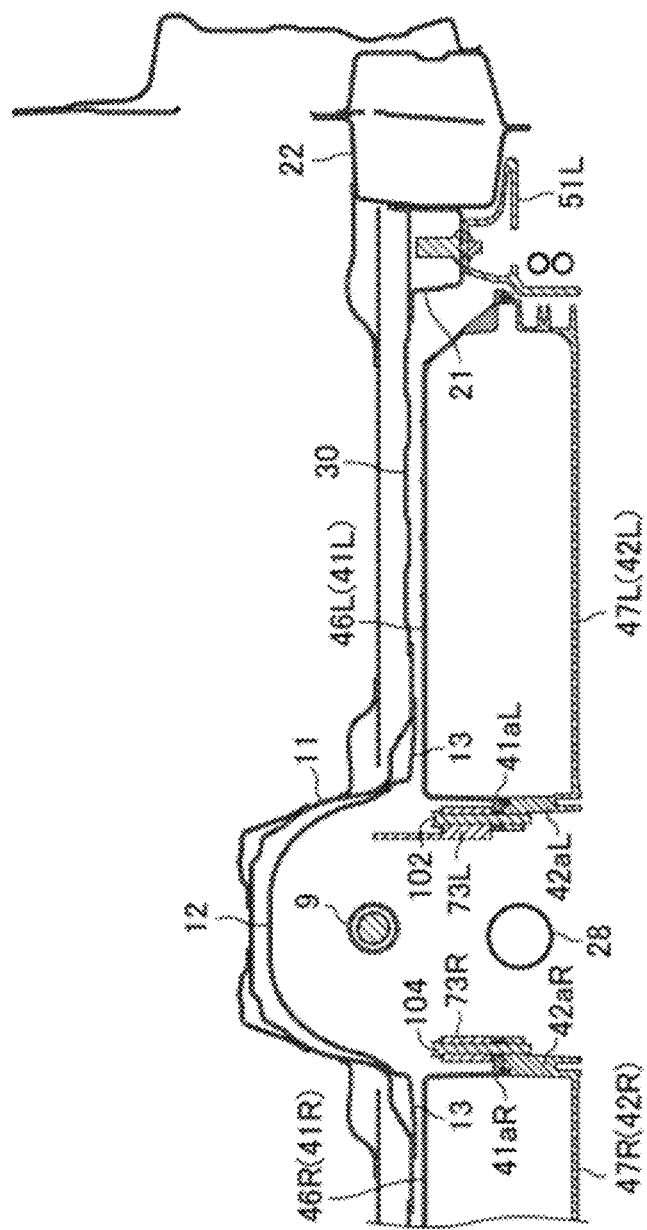
FIG. 9 is a sectional view, taken along line IX-IX line in FIG. 4, that illustrates the portion from a tunnel panel to a left side sill according to an exemplary embodiment.
Figure 10:
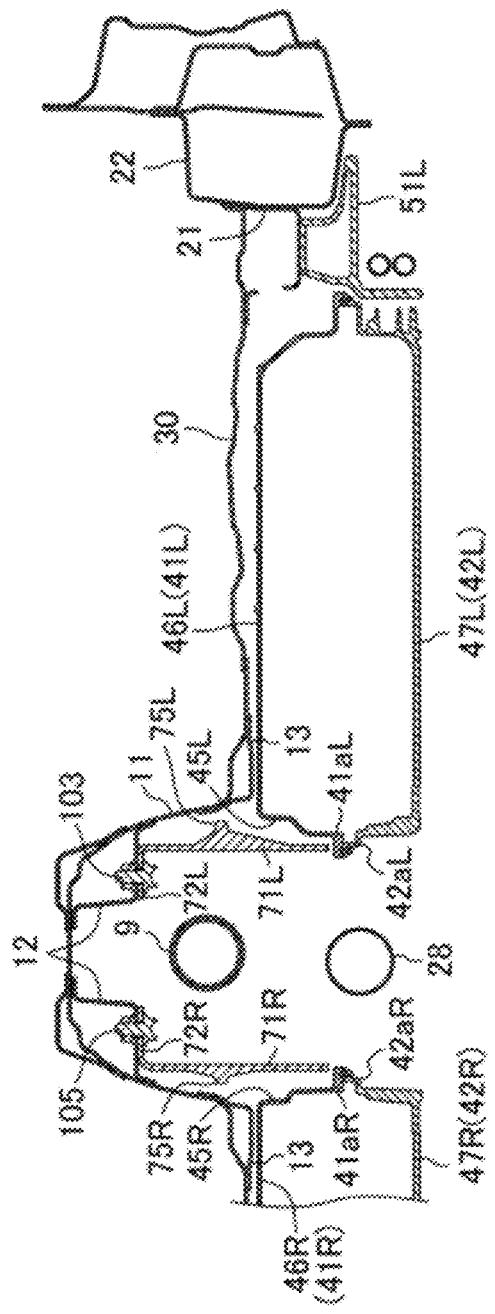
FIG. 10 is a sectional view, taken along line X-X in FIG. 4, that illustrates the portion from the tunnel panel to the left side sill according to an exemplary embodiment.

A pair of left and right floor panels 30 constituting the floor of the vehicle interior are provided on the left and right sides of the tunnel panel 11. The floor panels 30 spread horizontally in the front-rear direction and the vehicle width direction (left-right direction). As illustrated in FIGS. 9 and 10, the right end portion of the left floor panel 30 is connected to the left end portion of the tunnel panel 11 by welding. The left end portion of the right floor panel 30 is connected to the right end portion of the tunnel panel 11 by welding. The left and right floor panels 30 are connected to each other in the left-right direction by the tunnel panel 11. The connection portions between the floor panels 30 and the tunnel panel 11 are located at the same positions as the connection portions between the tunnel panel 11 and the side tunnel reinforcements 13 or are located on the outer side in the vehicle width direction of the connection portions between the tunnel panel 11 and the side tunnel reinforcements 13.

Left and right toe boards 32 are connected to the front end portions of the left and right floor panels 30 by welding, respectively. The left and right toe boards 32 extend from the front end portions of the left and right floor panels 30 toward the front side while being inclined upward. The upper end portions of the left and right toe boards 32 are joined to the lower end portion of a dash panel (not illustrated) that separates the vehicle interior from the engine room. The right end portion of the left toe board 32 is connected to the left end portion of the tunnel panel 11 by welding. The left end portion of the right toe board 32 is connected to the right end portion of the tunnel panel 11 by welding.

A pair of left and right floor frames 21 that extend in the front-rear direction are connected to the lower surfaces of the left and right floor panels 30 and the lower surfaces of the left and right toe boards 32, respectively. The left and right floor frames 21 extend toward the rear side while being inclined to the outer side in the vehicle width direction so as to be separated from each other in the vehicle width direction, and then extend straight toward the rear side in parallel to each other. As illustrated in FIGS. 9 and 10, the floor frames 21 have a U-shaped cross section with the upper side thereof open. The floor frames 21 are connected to the lower surfaces of the left and right floor panels 30 and the lower surfaces of the left and right toe boards 32 by welding so as to form closed cross sections between the floor frames 21, the floor panels 30, and the toe boards 32.

A pair of left and right side sills 22 that extend in the front-rear direction are connected to the outer end portions in the vehicle width direction of the left and right floor panels 30. The left and right side sills 22 are located on the outer side in the vehicle width direction of the left and right floor frames 21. As illustrated in FIGS. 9 and 10, the left side sill 22 is connected to the left end portion of the left floor panel 30 by welding. The right side sill 22 is connected to the right end portion of the right floor panel 30 by welding.

As illustrated in FIG. 2, the front end portions of the left and right floor frames 21 may be connected to the front end portions of the left and right side sills 22 via left and right gussets 23, respectively.

As illustrated in FIGS. 1 and 2, on the left and right sides of the floor tunnel in the region behind the transfer 4a, the left and right battery units 40L and 40R in which power for driving the motor 3 is stored are disposed. The left battery unit 40L is disposed below the passenger seat and the right battery unit 40R is disposed below the driver seat. The left and right battery units 40L and 40R are electrically connected to each other by a connector. The right end portion of the left battery unit 40L and the left end portion of the right battery unit 40R slightly overlap the floor tunnel 10 as seen in the up-down direction. The battery units 40L and 40R will be described in detail later.

Figure 4:
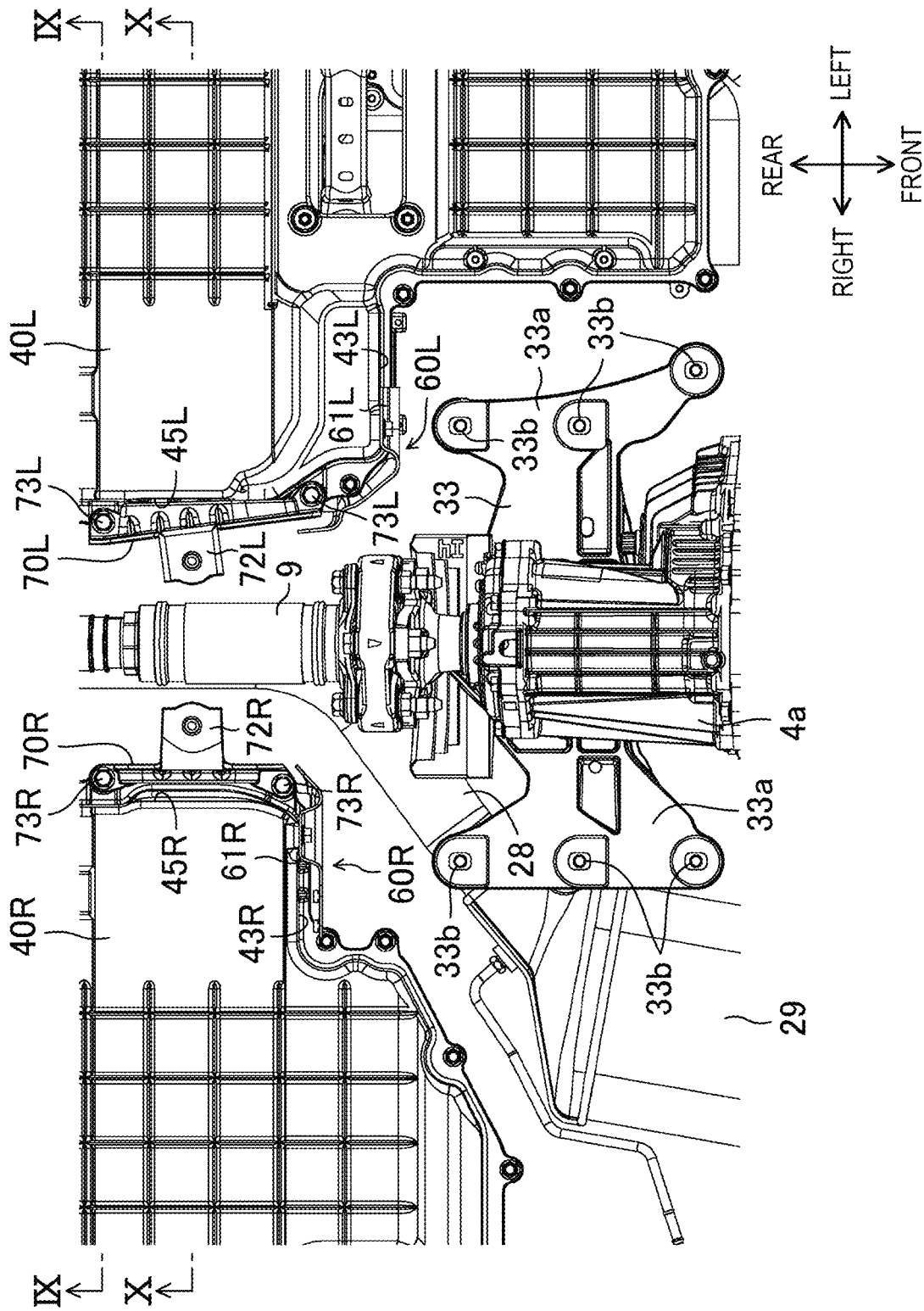
FIG. 4 is a plan view illustrating the periphery of the portion of a gearbox on the vehicle rear side as seen from above according to an exemplary embodiment.

In one embodiment, as illustrated in FIG. 2, a transmission support member 33 that supports the transfer 4a (that is, the transmission 4) is provided slightly in front of the left and right battery units 40L and 40R. As illustrated in FIG. 4, the transmission support member 33 is disposed in proximity to the front surface portions 43L and 43R (referred to below as the left front surface portion 43L and the right front surface portion 43R) of the battery units 40L and 40R so as to face the left front surface portion 43L and the right front surface portion 43R. The transmission support member 33 has a U-shape that spreads toward the outer side in the vehicle width direction toward the upper side as seen in the front-rear direction. The transmission support member 33 is mounted to the vehicle body so as to straddle the floor tunnel 10 as seen in the front-rear direction.

The U-shaped portion of the transmission support member 33 has a wide shape that spreads in the front-rear direction. The left and right upper end portions of the transmission support member 33 are mount portions 33a through which the transmission support member 33 is mounted to the vehicle body. As illustrated in FIG. 4, the left and right mount portions 33a project to the front side and the rear side of the other portions of the transmission support member 33. The mount portions 33a each have a plurality of (three for each and six in total in this case) holes 33b through which bolts 101 pass.

In one embodiment, as illustrated in FIGS. 2 and 4, an exhaust pipe 28 through which the exhaust gas from the engine 2 passes is disposed on the right side of the transmission support member 33. The exhaust pipe 28 extends from the engine 2 toward the floor tunnel 10 through the right side of the transmission 4 and the transmission support member 33, passes through the floor tunnel 10, and extends toward the rear side. The exhaust pipe 28 has an exhaust gas purification device 29 on the right side of the transmission support member 33. The exhaust gas purification device 29 has a horizontally long elliptical shape and has an exhaust gas purification catalyst 29a therein. The exhaust pipe 28 enters the floor tunnel 10 through the space between the front surface portion 43R of the right battery unit 40R and the transmission support member 33 at the same height as the front surface portion 43R (more specifically, a right front protector 60R described later) of the right battery unit 40R and the transmission support member 33.

Next, the peripheral structures of the left battery unit 40L and the right battery unit 40R will be described in detail.

Figure 5:
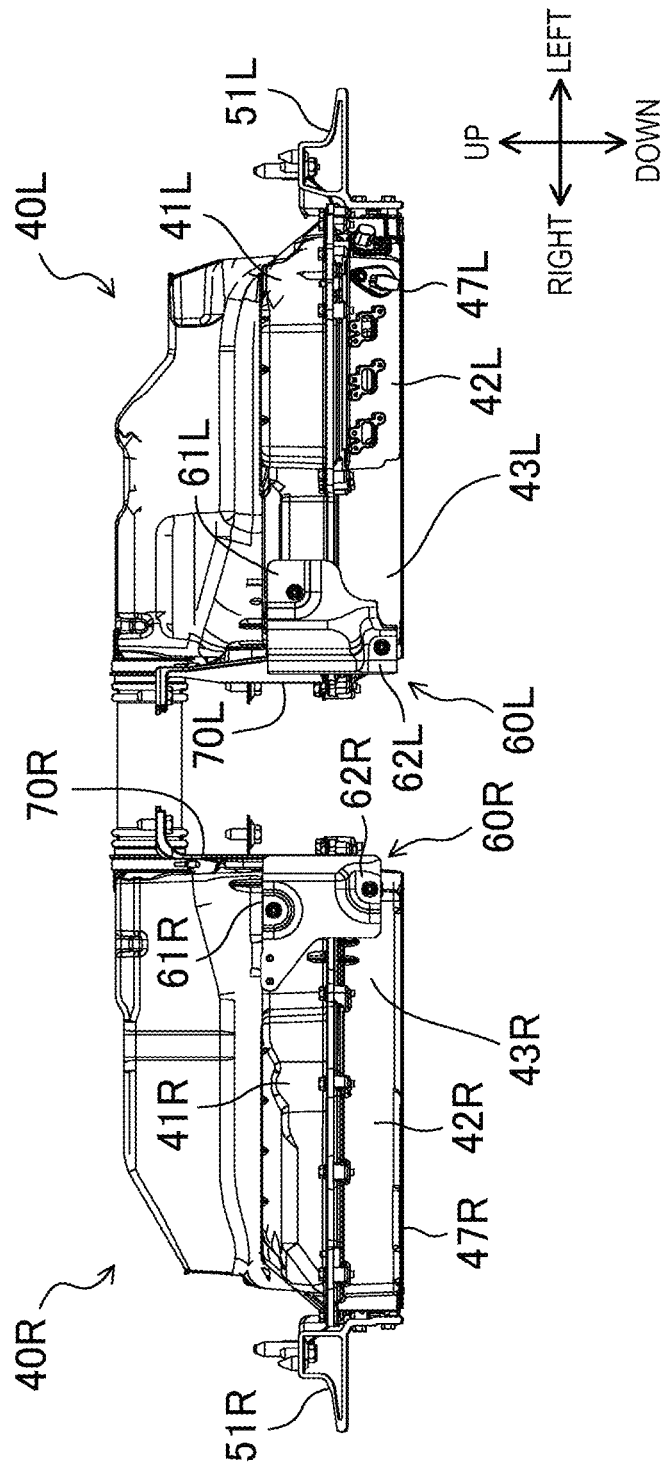
FIG. 5 is a diagram illustrating left and right battery units as seen from the front side according to an exemplary embodiment.

First, the peripheral structure of the left battery unit 40L will be described. As illustrated in FIGS. 2 and 5, in one embodiment, the left battery unit 40L has a box shape and is substantially rectangular in bottom view. The left battery unit 40L includes the left front surface portion 43L, a left outer side surface portion 44L that extends in the front-rear direction from the outer end portion in the vehicle width direction of the left front surface portion 43L, a left inner side surface portion 45L that extends in the front-rear direction from the inner end portion in the vehicle width direction of the left front surface portion 43L, a left upper surface portion 46L that spreads horizontally from the upper end portion of the left front surface portion 43L toward the vehicle rear side, a left lower surface portion 47L that spreads from the lower end portion of the left front surface portion 43L so as to face the left upper surface portion 46L in the up-down direction, and a left rear surface portion 48L that faces the left front surface portion 43L in the front-rear direction. The edges of the surface portions 43L to 48L of the left battery unit 40L are integrated with each other. The inner portion in the vehicle width direction of the left front surface portion 43L is located behind the outer portion in the vehicle width direction. This forms a space in which the transmission support member 33 is disposed while the left battery unit 40L is made as large as possible.

Figure 6:
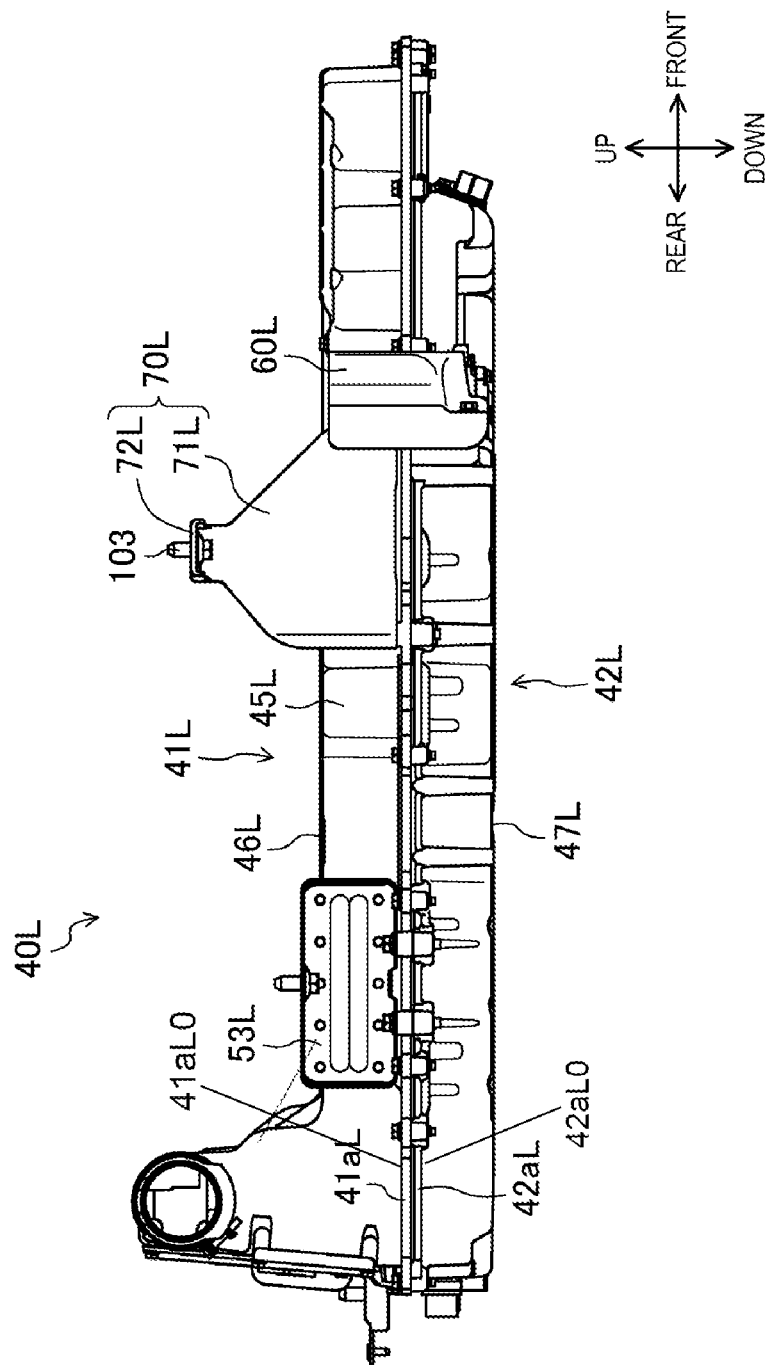
FIG. 6 is a diagram illustrating the left battery unit as seen from the right side according to an exemplary embodiment.

As illustrated in FIGS. 5 and 6, in one embodiment, the left battery unit 40L has a first left case 41L and a second left case 42L divided in the up-down direction. The first left case 41L includes the left upper surface portion 46L and is located relatively upward. The second left case 42L includes the left lower surface portion 47L and is located relatively downward. The first left case 41L has a flange 41aL that extends along the edge in the lower end portion thereof and the second left case 42L has a flange 42aL that extends along the edge in the upper end portion thereof. The first left case 41L and the second left case 42L are connected to each other by a bolt with the flanges thereof abutting against each other in the up-down direction. A sealing member is disposed in the contact portion between the first left case 41L and the second left case 42L. The flanges 41aL and 42aL correspond to projecting portions that project toward the inner side in the vehicle width direction from the left inner side surface portion 45L.

In one embodiment, the left battery unit 40L is supported by the vehicle body via a plurality of brackets. Specifically, a first left bracket 51L and a second left bracket 52L are mounted to the left outer side surface portion 44L of the left battery unit 40L. In addition, a third left bracket 53L is mounted to the left inner side surface portion 45L of the left battery unit 40L.

The first left bracket 51L is mounted at the middle position in the front-rear direction of the left outer side surface portion 44L and the second left bracket 52L is mounted at the position of the rear end of the left outer side surface portion 44L. As illustrated in FIG. 5, the lower portion of the first left bracket 51L is mounted to the second left case 42L by bolts. Although not illustrated, the lower portion of the second left bracket 52L is mounted to the second left case 42L by bolts. The upper end portions of the first left bracket 51L and the second left bracket 52L are fixed to the lower surface of the left floor frame 21 by bolts (FIG. 9 illustrates only the connection portion between the first left bracket 51L and the left floor frame 21).

The third left bracket 53L is mounted at the middle position in the front-rear direction on the left inner side surface portion 45L. As illustrated in FIG. 6, the lower portion of the third left bracket 53L is mounted to the flange 41aL of the first left case 41L and the flange 42aL of the second left case 42L from the upper side by bolts. The upper end portion of the third left bracket 53L is fixed to the upper tunnel reinforcement 12 by bolts. FIG. 3 illustrates the connection portion between a third right bracket 53R, which will be described later, and the upper tunnel reinforcement 12, and the connection portion between a third left bracket 53L and the upper tunnel reinforcement 12 cannot be seen because the upper tunnel reinforcement 12 overlaps the connection portion.

As illustrated in FIGS. 2 to 6, in one embodiment, a left inner protector 70L that covers the left inner side surface portion 45L from the inner side in the vehicle width direction is mounted to the front portion of the left inner side surface portion 45L. The left inner protector 70L is a member that prevents the transfer 4a from coming into contact with the left inner side surface portion 45L of the left battery unit 40L when the transmission 4 enters the floor tunnel 10 together with the transfer 4a at the time of a front collision. In addition, the left inner protector 70L is a member that prevents the left battery unit 40L from being removed from the vehicle body by a collision load applied downward to the left battery unit 40L when the transfer 4a is caught by the flange of the first left case 41L. The left inner protector 70L is made of, for example, cast iron.

The left inner protector 70L includes a left protection portion 71L that actually covers the left inner side surface portion 45L and a left vehicle body connection portion 72L that is connected to the vehicle body structural member. The left vehicle body connection portion 72L is provided in the upper end portion of the left protection portion 71L.

Figure 7:
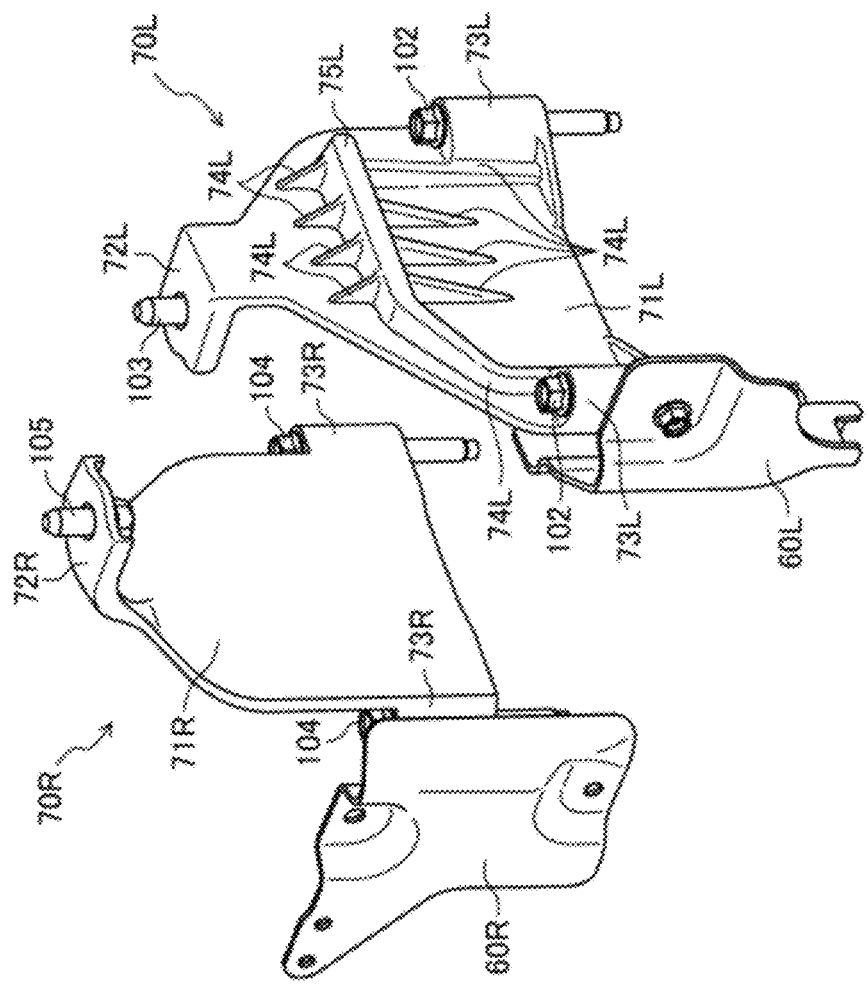
FIG. 7 is a perspective view illustrating front protectors and inner protectors according to an exemplary embodiment.
Figure 8:
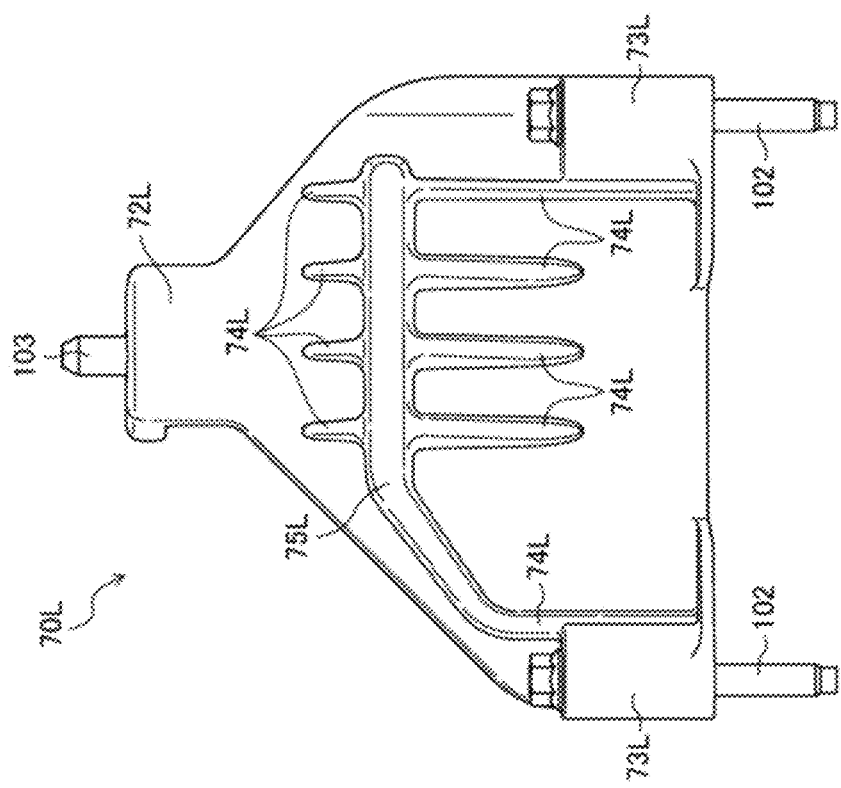
FIG. 8 is a perspective view illustrating an outer surface in the vehicle width direction of a left inner protector according to an exemplary embodiment.

The left protection portion 71L covers the portion of the left inner side surface portion 45L of the first left case 41L. As illustrated in FIGS. 6 to 8, the width in the front-rear direction of the left protection portion 71L is gradually smaller toward the upper side. Specifically, the front end portion of the left protection portion 71L is inclined to the rear side toward the left vehicle body connection portion 72L, and the rear end portion of the left protection portion 71L extends straight toward the upper side, curves toward the front side, and extends toward the left vehicle body connection portion 72L while being inclined. Accordingly, the left vehicle body connection portion 72L has a smaller width in the vehicle front-rear direction than the left protection portion 71L.

As illustrated in FIGS. 9 and 10, in one embodiment, the inner surface (that is, the right surface) in the vehicle width direction of the left protection portion 71L is located at substantially the same position in the vehicle width direction as the inner ends in the vehicle width direction of the upper and lower flanges 41aL and 42aL.

As illustrated in FIGS. 7 and 8, in one embodiment, the outer surface (that is, the left surface) in the vehicle width direction of the left protection portion 71L is provided with two left mount portions 73L through which the left inner protector 70L is mounted to the left battery unit 40L. The left mount portions 73L are provided in the end portion on the front side and the lower side and the end portion on the rear side and the lower side of the left protection portion 71L, respectively. Bolts 102 (shaft-like fastening members) are inserted into the left mount portions 73L so as to extend in the up-down direction. As illustrated in FIG. 9, the bolts 102 are fastened to the upper and lower flanges 41aL and 42aL, respectively, so as to extend in the up-down direction (FIG. 9 illustrates only the left mount portion 73L on the rear side). This fixes the left inner protector 70L to the upper and lower flanges 41aL and 42aL of the left battery unit 40L.

A plurality of reinforcing ribs are provided on the outer surface (that is, the left surface) in the vehicle width direction of the left protection portion 71L. The reinforcing ribs include a plurality of (five in this case) left vertical ribs 74L that extend in the up-down direction and one left horizontal rib 75L that extends in the front-rear direction. The left vertical ribs 74L are wider toward the left horizontal rib 75L. The left vertical rib 74L on the frontmost side of the plurality of left vertical ribs 74L is integrated with the left mount portion 73L on the front side. The left vertical rib 74L on the rearmost side of the plurality of left vertical ribs 74L is integrated with the left mount portion 73L on the rear side.

The left horizontal rib 75L extends straight from the position of the left vertical rib 74L located on the rearmost side to the front side through the middle portion in the up-down direction of the left vertical rib 74L, and then is integrated with the upper end portion of the left vertical rib 74L located on the frontmost side along the front end portion of the left protection portion 71L. The left horizontal rib 75L is integrated with the left vertical ribs 74L. As illustrated in FIG. 10, the left horizontal rib 75L is located at the same height as the tunnel panel 11. The left horizontal rib 75L projects to the outer side in the vehicle width direction of the left vertical ribs 74L and the tip thereof is located near the tunnel panel 11.

As illustrated in FIGS. 7 and 8, in one embodiment, the left vehicle body connection portion 72L extends toward the upper side from the upper end portion of the left protection portion 71L and is bent substantially at a right angle toward the inner side in the vehicle width direction. The left vehicle body connection portion 72L is fixed to the upper tunnel reinforcement 12 by a bolt 103. As illustrated in FIG. 10, the bolt 103 is fastened to the weld nut provided in the upper tunnel reinforcement 12 so as to extend in the up-down direction.

The left mount portions 73L are mounted to the left battery unit 40L and the left vehicle body connection portion 72L is connected to the upper tunnel reinforcement 12, whereby the left battery unit 40L is supported by the vehicle body via the left inner protector 70L. That is, the left inner protector 70L also serves as a bracket. It should be noted that FIG. 3 illustrates the connection portion between a right inner protector 70R, which will be described later, and the upper tunnel reinforcement 12 and the connection portion between the left inner protector 70L and the upper tunnel reinforcement 12 cannot be seen because the upper tunnel reinforcement 12 overlaps the connection portion.

As illustrated in FIGS. 4 to 7, in one embodiment, the left front surface portion 43L of the left battery unit 40L is provided with a left front protector 60L that covers the inner portion in the vehicle width direction of the left front surface portion 43L from the front side. The left front protector 60L is provided to suppress a direct collision between the left battery unit 40L and the transmission support member 33 when the transmission support member 33 moves backward at the time of a front collision.

The inner end portion in the vehicle width direction of the left front protector 60L is located on the inner side in the vehicle width direction of the front end portion of the left inner protector 70L. Accordingly, a part of the front end portion of the left inner protector 70L is covered with the inner end portion in the vehicle width direction of the left front protector 60L as seen from the front side. In addition, the inner end portion in the vehicle width direction of the left front protector 60L is inclined to the rear side toward the inner side in the vehicle width direction. That is, the left front protector 60L covers the front end portion of the left inner protector 70L even in the vehicle width direction.

The left front protector 60L is mounted to the left battery unit 40L via left front mount portions 61L and 62L at two positions.

Next, the peripheral structure of the right battery unit 40R will be described. In the peripheral structure of the right battery unit 40R, the detailed shape is different from that of the left battery unit 40L, but the basic structure is symmetrical with respect to that of the left battery unit 40L. Accordingly, only the different portion between the peripheral structure of the right battery unit 40R and the peripheral structure of the left battery unit 40L will be described in detail and the same portion as the peripheral structure of the left battery unit 40L will not be described in detail as appropriate.

As illustrated in FIGS. 2 and 5, in one embodiment, the right battery unit 40R has a box shape and is substantially rectangular in bottom view. The right battery unit 40R includes the right front surface portion 43R, a right outer side surface portion 44R that extends in the front-rear direction from the outer end portion in the vehicle width direction of the right front surface portion 43R, a right inner side surface portion 45R that extends in the front-rear direction from the inner end portion in the vehicle width direction of the right front surface portion 43R, a right upper surface portion 46R that spreads horizontally from the upper end portion of the right front surface portion 43R toward the vehicle rear side, a right lower surface portion 47R that spreads from the lower end portion of the right front surface portion 43R so as to face the right upper surface portion 46R in the up-down direction, and a right rear surface portion 48R that faces the right front surface portion 43R in the front-rear direction. The edges of the surface portions 43R to 48R of the right battery unit 40R are integrated with each other. In the right front surface portion 43R, the inner portion in the vehicle width direction is located behind the outer portion in the vehicle width direction.

As illustrated in FIGS. 5, 9, and 10, in one embodiment, the right battery unit 40R includes a first right case 41R and a second right case 42R divided in the up-down direction. The first right case 41R has a flange 41aR that extends along the edge in the lower end portion and the second right case 42R has a flange 42aR that extends along the edge in the upper end portion. The first right case 41R and the second right case 42R are connected to each other by bolts with the flanges thereof abutting against each other in the up-down direction. A sealing member is disposed in the contact portion between the first right case 41R and the second right case 42R. The flanges 41aR and 42aR correspond to projecting portions that project toward the inner side in the vehicle width direction from the right inner side surface portion 45R.

The right battery unit 40R is supported by the vehicle body via a plurality of brackets. Specifically, a first right bracket 51R and a second right bracket 52R are mounted to the right outer side surface portion 44R of the right battery unit 40R. In addition, a third right bracket 53R is mounted to the right inner side surface portion 45R of the right battery unit 40R. Since the structures of the first to third right brackets 51R to 53R are symmetrical with respect to those of the first to third left brackets 51L to 53L, detailed description thereof will be omitted.

As illustrated in FIGS. 4 and 5, in one embodiment, the right inner protector 70R that covers the right inner side surface portion 45R from the inner side in the vehicle width direction is mounted to the front portion of the right inner side surface portion 45R. Since the operation of the right inner protector 70R on the right battery unit 40R is the same as the operation of the left inner protector 70L on the left battery unit 40L, detailed description thereof will be omitted. The right inner protector 70R is made of, for example, cast iron.

The right inner protector 70R includes a right protection portion 71R that actually covers the right inner side surface portion 45R and a right vehicle body connection portion 72R that is connected to the vehicle body structural member. The right vehicle body connection portion 72R is provided in the upper end portion of the right protection portion 71R.

The right protection portion 71R covers the portion of the first right case 41R of the right inner side surface portion 45R. As illustrated in FIG. 7, the right protection portion 71R is symmetrical in the front-rear direction, extends straight from the lower side to the upper side, and then gradually reduces in width in the front-rear direction toward the right vehicle body connection portion 72R. The right vehicle body connection portion 72R has a smaller width in the vehicle front-rear direction than the right protection portion 71R.

As illustrated in FIGS. 9 and 10, in one embodiment, the inner surface (that is, the left surface) in the vehicle width direction of the right protection portion 71R is located at substantially the same position as the inner end in the vehicle width direction of the upper and lower flanges 41aR and 42aR.

As illustrated in FIGS. 4, 7, and 8, in one embodiment, two right mount portions 73R through which the right inner protector 70R is mounted to the right battery unit 40R are provided on the outer surface (that is, the right surface) in the vehicle width direction of the right protection portion 71R. One of the right mount portions 73R is provided in the end portion on the front side and the lower side of the right protection portion 71R and the other of the right mount portions 73R is provided in the end portion on the rear side and the lower side, respectively. Bolts 104 (shaft-like fastening members) are inserted into the right mount portions 73R so as to extend in the up-down direction. As illustrated in FIG. 9, the bolts 104 are fastened to the upper and lower flanges 41aR and 42aR, respectively, while extending in the up-down direction (FIG. 9 illustrates only the right mount portion 73R on the rear side). This fixes the right inner protector 70R to the upper and lower flanges 41aR and 42aR of the right battery unit 40R.

As illustrated in FIG. 11, in one embodiment, a plurality of reinforcing ribs are provided on the outer surface (that is, the left surface) in the vehicle width direction of the right protection portion 71R. The reinforcing ribs include a plurality of (five in this case) right vertical ribs 74R that extend in the up-down direction and one right horizontal rib 75R that extends in the front-rear direction. The right vertical ribs 74R are wider toward the right horizontal rib 75R. The right vertical rib 74R on the frontmost side of the plurality of right vertical ribs 74R is integrated with the right mount portion 73R on the front side. The right vertical rib 74R on the rearmost side of the plurality of right vertical ribs 74R is integrated with the right mount portion 73R on the rear side.

The right horizontal rib 75R extends straight from the upper end position of the right vertical rib 74R located on the rearmost side to the front side through the middle portion in the up-down direction of the right vertical rib 74R, and then is integrated with the upper end portion of the right vertical rib 74R located on the frontmost side. The right horizontal rib 75R is integrated with the right vertical ribs 74R. As illustrated in FIG. 10, the right horizontal rib 75R is located at the same height as the tunnel panel 11. The right horizontal rib 75R projects to the outer side in the vehicle width direction of the right vertical rib 74R and the tip thereof is located near the tunnel panel 11.

As illustrated in FIG. 7, in one embodiment, the right vehicle body connection portion 72R extends toward the upper side from the upper end portion of the right protection portion 71R and is bent substantially at a right angle toward the inner side in the vehicle width direction. The right vehicle body connection portion 72R is fixed to the upper tunnel reinforcement 12 by a bolt 105. As illustrated in FIG. 10, the bolt 105 is fastened to the weld nut provided in the upper tunnel reinforcement 12 so as to extend in the up-down direction.

The right mount portions 73R are mounted to the right battery unit 40R and the right vehicle body connection portion 72R is connected to the upper tunnel reinforcement 12, whereby the right battery unit 40R is supported by the vehicle body via the right inner protector 70R. That is, the right inner protector 70R also serves as a bracket.

As illustrated in FIGS. 4, 5, and 7, in one embodiment, the right front surface portion 43R of the right battery unit 40R is provided with a right front protector 60R that covers the inner portion in the vehicle width direction of the right front surface portion 43R from the front side. The right front protector 60R is provided to suppress a direct collision between the right battery unit 40R and the transmission support member 33 when the transmission support member 33 moves backward at the time of a front collision.

The inner end portion in the vehicle width direction of the right front protector 60R is located on the inner side in the vehicle width direction of the front end portion of the right inner protector 70R. Accordingly, a part of the front end portion of the right inner protector 70R is covered with the inner end portion in the vehicle width direction of the right front protector 60R as seen from the front side. In addition, the inner end portion in the vehicle width direction of the right front protector 60R is inclined to the rear side toward the inner side in the vehicle width direction. That is, the right front protector 60R covers the front end portion of the right inner protector 70R even in the vehicle width direction.

The right front protector 60R is mounted to the right battery unit 40R via right front mount portions 61R and 62R at two positions.

Here, when the transfer 4a of the transmission 4 is disposed in the floor tunnel 10 as in the embodiment, the transfer 4a moves backward while entering the floor tunnel 10 at the time of a front collision. In addition, since the rear propeller shaft 9 is provided with the universal joint 9a, the rear propeller shaft 9 may pivot in the left-right direction (vehicle width direction) at the time of a front collision. When the rear propeller shaft 9 pivots in the left-right direction, the transfer 4a moves backward, diagonally to the left or diagonally to the right. Accordingly, the transfer 4a may come into contact with the left battery unit 40L or the right battery unit 40R. In particular, since the transfer 4a is disposed in proximity to the portions on the front side and the upper side of the left and right battery units 40L and 40R and is inclined to the lower side toward the rear side, the transfer 4a may move backward while rubbing the left or right inner surface portion 45L or 45R diagonally downward at the time of a front collision.

In contrast, since the left and right inner protectors 70L and 70R are provided on the left and right inner surfaces 45L and 45R in the embodiment, it is possible to prevent the transfer 4a from coming into contact with the left and right inner surfaces 45L and 45R at the time of a front collision. This can suppress damage to the left and right battery units 40L and 40R at the time of a front collision.

In addition, since the left and right inner side surface portions 45L and 45R are provided with the flanges 41aL, 42aL, 41aR, and 42aR that project toward the inner side in the vehicle width direction in the embodiment, the left or right inner side surface portion 45L or 45R may drop because the transfer 4a is caught by the flanges 41aL, 42aL, 41aR, and 42aR at the time of a front collision. However, since the inner surfaces in the vehicle width direction of the protection portions 71L and 71R of the left and right inner protectors 70L and 70R are present at substantially the same positions in the vehicle width direction as the inner edges in the vehicle width direction of the flanges 41aL, 42aL, 41aR, and 42aR in the embodiment, it is possible to effectively prevent the transfer 4a from being caught by the flanges 41aL, 42aL, 41aR, and 42aR.

In addition, in one embodiment, the left and right inner protectors 70L and 70R include reinforcing ribs including the plurality of left and right vertical ribs 74L and 74R that extend in the up-down direction and left and right horizontal ribs 75L and 75R that extend in the front-rear direction. This can suppress damage to the left and right inner protectors 70L and 70R even when a collision load is input from the transfer 4a to the left and right inner protectors 70L and 70R at the time of a front collision. As a result, damage to the left and right battery units 40L and 40R can be suppressed more effectively.

In addition, in one embodiment, the left and right horizontal ribs 75L and 75R are located at the same height as the tunnel panel 11. That is, when the transfer 4a moves diagonally backward and comes into contact with the left or right inner protector 70L or 70R, a collision load in the vehicle width direction (left-right direction) is input to the inner protector with which the transfer 4a comes into contact. When the inner protector is deformed by this collision load, the left or right horizontal rib 75L or 75R comes into contact with the tunnel panel 11, whereby the collision load can be received by the vehicle body. This suppresses the deformation of the left and right battery units 40L and 40R. Accordingly, damage to the left and right battery units 40L and 40R can be suppressed more effectively.

In addition, in one embodiment, the left inner protector 70L is fixed to the upper and lower flanges 41aL and 42aL of the left inner side surface portion 45L by the bolts 102, the right inner protector 70R is fixed to the upper and lower flanges 41aR and 42aR of the right inner side surface portion 45R by the bolts 104, and the bolts 102 and 104 are fastened so as to extend in the up-down direction. Accordingly, even when the transfer 4a comes into contact with the left or right inner protector 70L or 70R at the time of a front collision and the collision load is input to the left or right inner protector 70L or 70R, the collision load can be received by the bolts 102 or the bolts 104. As a result, the left and right inner protectors 70L and 70R can be prevented from peeling off from the left and right inner side surface portions 45L and 45R at the time of a front collision. Accordingly, damage to the left and right battery units 40L and 40R can be suppressed more effectively.

In addition, in one embodiment, the left and right front protectors 60L and 60R that cover the front end portions of the left and right inner protectors 70L and 70R from the vehicle front side are mounted to the left and right battery units 40L and 40R, respectively. This can prevent the left or right inner protector 70L or 70R from peeling off from the left or right battery units 40L or 40R because the transfer 4a is caught by the front end portion of the left or right inner protector 70L or 70R at the time of a front collision. As a result, damage to the left and right battery units 40L and 40R can be suppressed more effectively.

In addition, in one embodiment, the left and right inner protectors 70L and 70R are connected to the vehicle body structural member (upper tunnel reinforcement 12) via the left and right vehicle body connection portions 72L and 72R. This can cause the vehicle body to receive the collision load input when the transfer 4*a* comes into contact with the left and right inner protectors 70L and 70R. As a result, damage to the left and right battery units 40L and 40R can be suppressed.

In addition, in one embodiment, the left and right vehicle body connection portions 72L and 72R have smaller widths in the front-rear direction than the left and right protection portions 71L and 71R. This can reduce the weight of the vehicle 1 while suppressing damage to the left and right battery units 40L and 40R.

Other Embodiments

The technique disclosed herein is not limited to the embodiment described above and may be applied to other embodiments within the spirit of the claims.

For example, the vehicle 1 is a four-wheel-drive vehicle in the embodiment described above. However, the vehicle 1 is not limited to a four-wheel-drive vehicle and may be, for example, an FR vehicle. When the vehicle 1 is a FR vehicle, the transfer 4*a* and the front propeller shaft 8 are omitted. In addition, the vehicle 1 may be an electric vehicle that does not have the engine 2 but has only the motor 3 as the drive source.

In addition, in the embodiment described above, the left and right inner protectors 70L and 70R have the left and right vehicle body connection portions 72L and 72R and also serve as brackets. The left and right inner protectors 70L and 70R are not limited to this example and do not need to have the left and right vehicle body connection portions 72L and 72R.

The embodiment described above is only an example and the scope of the present disclosure should not be understood in a limited manner. The scope of the present disclosure is defined by the claims and all modifications and changes belonging to the equivalent scope of the claims fall within the scope of the present disclosure.

INDUSTRIAL APPLICABILITY

The technique disclosed herein is useful as the lower structure of a vehicle having rear wheels as drive wheels.

DESCRIPTION OF REFERENCE SIGNS AND NUMERALS

1: vehicle
2: engine
4: transmission (gearbox)
4*a*: transfer (gearbox)
9: rear propeller shaft
10: floor tunnel
30: floor panel
33: transmission support member (support member)
40L, 40R: left battery unit, right battery unit
41*a*L, 41*a*R: flange (projecting portion)
42*a*L, 42*a*R: flange (projecting portion)
43L, 43R: left front surface portion, right front surface portion
45L, 45R: left inner side surface portion, right inner side surface portion
60L, 60R: left front protector, right front protector
70L, 70R: left inner protector, right inner protector
71L, 71R: left protection portion, right protection portion
72L, 72R: left vehicle body connection portion, right vehicle body connection portion
74L, 74R: left vertical rib, right vertical rib
75L, 75R: left horizontal rib, right horizontal rib
102: bolt (shaft-like fastening member)
104: bolt (shaft fastening)

The invention claimed is:

1. A lower structure of a vehicle in which a rear wheel serves as a drive wheel, the lower structure comprising:
a gearbox disposed with at least a portion thereof present in a floor tunnel formed by a tunnel panel, the portion being present on a vehicle rear side;
a propeller shaft that extends from the gearbox toward the vehicle rear side, the propeller shaft transmitting power from the gearbox to the rear wheel; and
left and right battery units disposed on a vehicle lower side of left and right floor panels respectively, the left and right floor panels being disposed on a vehicle left side and a vehicle right side of the floor tunnel respectively,
wherein the portion of the gearbox on the vehicle rear side is disposed in proximity to portions on a vehicle front side and a vehicle upper side of the left and right battery units,
each of the left and right battery units has an inner side surface portion that extends in a vehicle front-rear direction, and
each of the left and right battery units has an inner protector including a protection portion that covers a front end portion of the inner side surface portion from an inner side in the vehicle width direction and a vehicle body connection portion to be connected to a vehicle body structural member of the vehicle, wherein a width of the protection portion in a front-rear direction is smaller toward an upper side, and the protection portion extends vertically from a lower side to the upper side towards the vehicle body connection portion, which is at the upper side of the protection portion and extends toward the inner side in the vehicle width direction.

2. The lower structure of a vehicle according to claim 1, wherein the vehicle body connection portion of the inner protector has a smaller width in a vehicle front-rear direction than the protection portion.

3. The lower structure of a vehicle according to claim 2, wherein a reinforcing rib is formed on an outer side surface portion in the vehicle width direction of the inner protector.

4. The lower structure of a vehicle according to claim 3, wherein the reinforcing rib includes a plurality of vertical ribs that extend in an up-down direction.

5. The lower structure of a vehicle according to claim 4, wherein the reinforcing rib includes a horizontal rib that extends in the vehicle front-rear direction, and
at least a part of the horizontal rib is located at the same height as the tunnel panel.

6. The lower structure of a vehicle according to claim 5, wherein the inner side surface portion of each of the left and right battery units has a projecting portion that projects to the inner side in the vehicle width direction, the inner protector is disposed in a region above the projecting portion of the inner side surface portion, the inner protector being fixed to the projecting portion via a shaft-like fastening member, and the shaft-like fastening member is fastened so as to extend in the up-down direction.

7. The lower structure of a vehicle according to claim 6, wherein an inner surface in the vehicle width direction of the inner protector is located at substantially the same position in the vehicle width direction as an inner end portion of the projecting portion in the vehicle width direction.

8. The lower structure of a vehicle according to claim 7, wherein each of the left and right battery units has a front protector that covers a front end portion of the inner protector from the vehicle front side.

9. The lower structure of a vehicle according to claim 8, wherein the portion of the gearbox on the vehicle rear side is included in a transfer.

10. The lower structure of a vehicle according to claim 1, wherein a reinforcing rib is formed on an outer side surface portion in the vehicle width direction of the inner protector.

11. The lower structure of a vehicle according to claim 1, wherein the inner side surface portion of each of the left and right battery units has a projecting portion that projects to the inner side in the vehicle width direction, the inner protector is disposed in a region above the projecting portion of the inner side surface portion, the inner protector being fixed to the projecting portion via a shaft-like fastening member, and the shaft-like fastening member is fastened so as to extend in the up-down direction.

12. The lower structure of a vehicle according to claim 11, wherein an inner surface in the vehicle width direction of the inner protector is located at substantially the same position in the vehicle width direction as an inner end portion of the projecting portion in the vehicle width direction.

13. The lower structure of a vehicle according to claim 1, wherein each of the left and right battery units has a front protector that covers a front end portion of the inner protector from the vehicle front side.

14. The lower structure of a vehicle according to claim 1, wherein the portion of the gearbox on the vehicle rear side is included in a transfer.

15. The lower structure of a vehicle according to claim 3, wherein the reinforcing rib includes a horizontal rib that extends in the vehicle front-rear direction, and at least a part of the horizontal rib is located at the same height as the tunnel panel.

16. The lower structure of a vehicle according to claim 10, wherein the reinforcing rib includes a plurality of vertical ribs that extend in an up-down direction.

17. The lower structure of a vehicle according to claim 10, wherein the reinforcing rib includes a horizontal rib that extends in the vehicle front-rear direction, and at least a part of the horizontal rib is located at the same height as the tunnel panel.

18. The lower structure of a vehicle according to claim 16, wherein the reinforcing rib includes a horizontal rib that extends in the vehicle front-rear direction, and at least a part of the horizontal rib is located at the same height as the tunnel panel.

19. The lower structure of a vehicle according to claim 17, wherein the inner side surface portion of each of the left and right battery units has a projecting portion that projects to the inner side in the vehicle width direction, the inner protector is disposed in a region above the projecting portion of the inner side surface portion, the inner protector being fixed to the projecting portion via a shaft-like fastening member, and the shaft-like fastening member is fastened so as to extend in the up-down direction.

20. The vehicle comprising the lower structure of the vehicle according to claim 1.

21. A lower structure of a vehicle in which a rear wheel serves as a drive wheel, the lower structure comprising:

a gearbox disposed with at least a portion thereof present in a floor tunnel formed by a tunnel panel, the portion being present on a vehicle rear side;

a propeller shaft that extends from the gearbox toward the vehicle rear side, the propeller shaft transmitting power from the gearbox to the rear wheel; and left and right battery units disposed on a vehicle lower side of left and right floor panels respectively, the left and right floor panels being disposed on a vehicle left side and a vehicle right side of the floor tunnel respectively, wherein the portion of the gearbox on the vehicle rear side is disposed in proximity to portions on a vehicle front side and a vehicle upper side of the left and right battery units, each of the left and right battery units has an inner side surface portion that extends in a vehicle front-rear direction, each of the left and right battery units has an inner protector including a protection portion that covers a front end portion of the inner side surface portion from an inner side in the vehicle width direction, wherein a width of the protection portion in a front-rear direction is smaller toward an upper side, and a reinforcing rib is formed on an outer side surface portion in the vehicle width direction of the inner protector, the reinforcing rib includes a horizontal rib that extends in the vehicle front-rear direction and a plurality of vertical ribs that extend in an up-down direction, the plurality of vertical ribs intersecting the horizontal rib.

* * * * *